(12) United States Patent
Lui

(10) Patent No.: US 8,065,599 B1
(45) Date of Patent: Nov. 22, 2011

(54) ELECTRONIC SUBMISSION PREPARATION

(75) Inventor: Zeke M. Lui, Mississauga (CA)

(73) Assignee: EMC Corporation, Hopkinton, MA (US)

( * ) Notice: Subject to any disclaimer, the term of this patent is extended or adjusted under 35 U.S.C. 154(b) by 1020 days.

(21) Appl. No.: 11/824,303

(22) Filed: Jun. 29, 2007

(51) Int. Cl.
*G06F 17/00* (2006.01)

(52) U.S. Cl. .................................................. 715/200

(58) Field of Classification Search ............... 715/200, 715/255
See application file for complete search history.

(56) References Cited

U.S. PATENT DOCUMENTS

| | | | |
|---|---|---|---|
| 5,142,620 A * | 8/1992 | Watanabe et al. | 715/201 |
| 5,701,500 A * | 12/1997 | Ikeo et al. | 715/209 |
| 6,091,835 A * | 7/2000 | Smithies et al. | 382/115 |
| 6,571,256 B1 * | 5/2003 | Dorian et al. | 726/2 |
| 7,181,682 B1 * | 2/2007 | Manson | 715/234 |
| 7,225,398 B1 * | 5/2007 | Jones et al. | 715/212 |
| 7,380,201 B2 * | 5/2008 | Vasey | 715/200 |
| 7,480,856 B2 * | 1/2009 | Jones | 715/234 |
| 7,669,115 B2 * | 2/2010 | Cho et al. | 715/212 |
| 7,720,616 B2 * | 5/2010 | Wyle et al. | 702/31 |
| 7,904,808 B2 * | 3/2011 | Harada | 715/255 |
| 2002/0107703 A1 * | 8/2002 | Feinberg et al. | 705/2 |
| 2002/0147604 A1 * | 10/2002 | Slate et al. | 705/1 |
| 2003/0014666 A1 * | 1/2003 | O'Keefe | 713/201 |
| 2004/0014013 A1 * | 1/2004 | Diesel et al. | 434/118 |
| 2004/0158587 A1 * | 8/2004 | Shay et al. | 707/201 |
| 2004/0172586 A1 * | 9/2004 | Ragnet et al. | 715/500 |
| 2004/0205448 A1 * | 10/2004 | Grefenstette et al. | 715/500 |
| 2004/0205664 A1 * | 10/2004 | Prendergast | 715/530 |
| 2004/0220815 A1 * | 11/2004 | Belanger et al. | 705/1 |
| 2005/0050445 A1 * | 3/2005 | Vasey | 715/500 |
| 2005/0079477 A1 * | 4/2005 | Diesel et al. | 434/350 |
| 2005/0278270 A1 * | 12/2005 | Carr et al. | 706/25 |
| 2006/0010377 A1 * | 1/2006 | Anecki et al. | 715/530 |
| 2007/0088663 A1 * | 4/2007 | Donahue | 705/80 |
| 2007/0198912 A1 * | 8/2007 | Meunier | 715/509 |
| 2008/0134025 A1 * | 6/2008 | Harada | 715/255 |
| 2008/0162310 A1 * | 7/2008 | Quinn et al. | 705/31 |
| 2009/0070135 A1 * | 3/2009 | Parida et al. | 705/2 |
| 2010/0287464 A1 * | 11/2010 | Grigoriadis et al. | 715/255 |
| 2011/0004820 A1 * | 1/2011 | Kloiber et al. | 715/255 |

OTHER PUBLICATIONS

Bergmark, Automatic Extraction of Reference Linking Informaiton from Online Documents, Google 2000, pp. 1-20.*
Pardo, A Multi-Agent Platform for Automatic Assignment Management, ACM 2002, pp. 60-64.*
Hummel, Electronic Data Submission in the Environmental Protection Agency Office of Pesticide Programs: Supplemental Files, Google 2002, pp. 1-11.*

* cited by examiner

*Primary Examiner* — Cong-Lac Huynh
(74) *Attorney, Agent, or Firm* — Van Pelt, Yi & James LLP

(57) ABSTRACT

Preparing an electronic submission is disclosed. A document is received. Submission preparation information to be used by a submission kernel for processing is identified based at least in part on information from the document. The document is processed based at least in part on the submission preparation information to produce one or more derived document outputs.

23 Claims, 5 Drawing Sheets

ELECTRONIC SUBMISSION PREPARATION

BACKGROUND OF THE INVENTION

Electronic submission of documents is becoming more common. In some cases, documents that are to be submitted have requirements in terms of the organization of attached documents, associated summary documents, associated form documents, etc. The submission requirements are typically dependent on where the documents are to be submitted. One solution is to construct a submission package of documents manually, for example, by using a word processing or other general software application to create a submission package of documents that includes required content and table of contents in a prescribed format. However, manual construction requires a knowledgeable operator and does not scale efficiently. Another solution to meeting the requirements is to build a custom application that produces from input documents a submission package of documents. However, although building a customized application does capture submission preparation knowledge enabling scaling, it may be burdensome to build and maintain and try to integrate into other processes a custom submission preparation application for each different type of submission preparation requirement. It would be beneficial to enable automated creation of a submission package of documents without building a custom application for each different type of submission preparation requirement.

BRIEF DESCRIPTION OF THE DRAWINGS

Various embodiments of the invention are disclosed in the following detailed description and the accompanying drawings.

DETAILED DESCRIPTION

Figure 1:
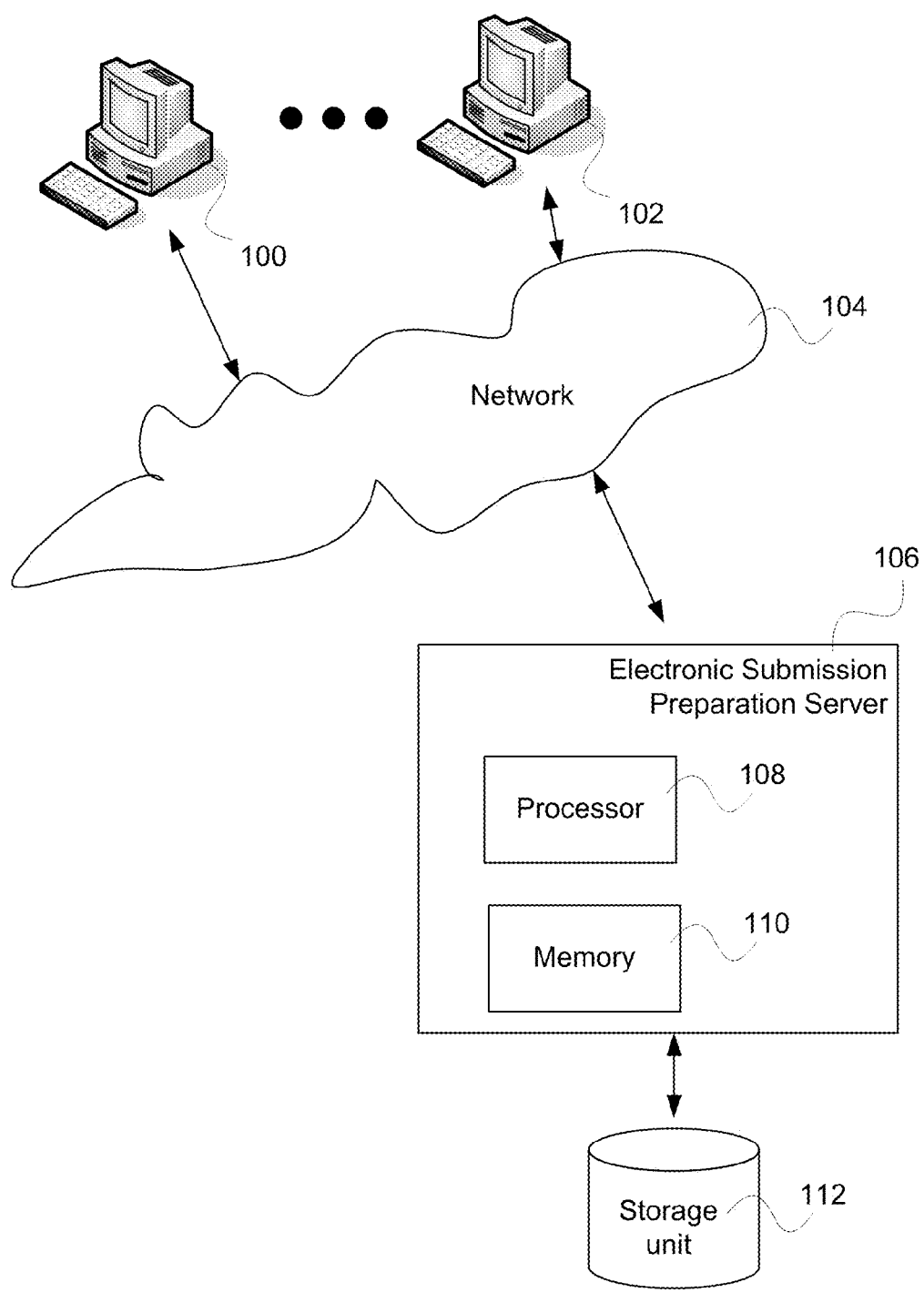
FIG. 1 is a block diagram illustrating an embodiment of a system for electronic submission preparation.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Automated preparation of an electronic submission is disclosed. One or more documents is/are received that are to be included in an electronic submission. Based on the documents received, information is identified regarding submission preparation of the documents based at least in part on the submitted document. The information is used by a generalized submission kernel to process the received documents and derive one or more document outputs. In various embodiments, the derived documents comprise one or more of the following: a form, an outline, a table of contents, an XML document, a file listing, an introduction, a summary, a checksum, or any other appropriate document, file, or other content. In various embodiments, one or more XML documents store the table of contents, the meta-data on the submission documents, the relationship among or between the submission documents, or any other appropriate XML content for a submission.

A general submission engine is able to capture of knowledge of the submission process allowing greater efficiency and scaling of processing for electronic documents for submission. The knowledge is captured in configuration(s), schema, and/or code that can be accessed by the general submission engine. In some embodiments, a generalized submission engine uses information in the form of configuration(s), schema, and/or code selected based on the submission to guide electronic submission preparation processing.

FIG. 1 is a block diagram illustrating an embodiment of a system for electronic submission preparation. In the example shown, one or more user(s) using a computer, such as computer 100 and/or computer 102, submit one or more documents to electronic submission preparation server 106. Computers, such as computer 100 and computer 102, communicate with electronic submission preparation server 106 using network 104. In various embodiments, network 104 comprises one or more of the following: a wired network, a wireless network, the Internet, a local area network, a wide area network, or any other appropriate network. Electronic submission preparation server 106 includes processor 108 and memory 110. A document submitted to electronic submission preparation server 106 is stored in memory 110 while being processed using processor 108. A received document or a derived document can be stored on storage unit 112. In various embodiments, storage unit 112 is a hard drive, a tape drive, a network attached storage unit, a redundant array of hard drives, a storage area network or any other appropriate unit to store documents. In various embodiments, storage unit 112 is separate from electronic submission preparation server 106, is combined with electronic submission preparation server 106, or is distributed to both a storage unit internal to electronic submission preparation server 106 and a storage unit external to electronic submission preparation server 106.

Figure 2:
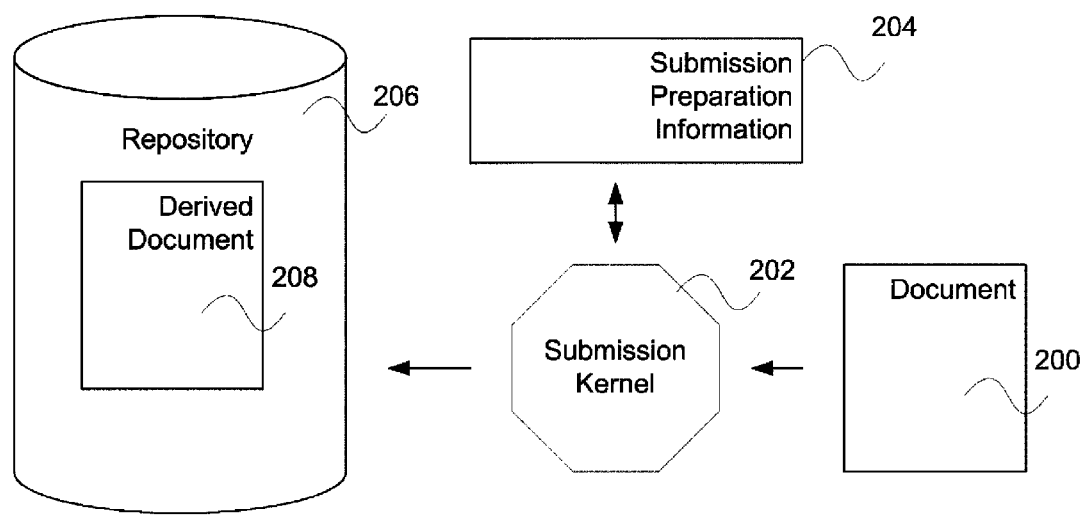
FIG. 2 is a block diagram illustrating submission flow for a system for electronic submission preparation.

FIG. 2 is a block diagram illustrating submission flow for a system for electronic submission preparation. In the example shown, document 200 is submitted to submission kernel 202. Submission kernel 202 comprises a general processing engine that, based at least in part on information in document

200 and/or associated metadata information, identifies submission preparation information 204. In various embodiments, submission kernel 202 includes methods, functions, or other code configured to perform tasks commonly required to assemble an electronic submission, such as parsing input documents and/or other data to extract required content data and/or metadata; assemble all or part of an electronic submission document or other file or data to be included in a submission; format data and/or documents in a manner prescribed; arrange documents and/or other content and associated metadata into a package, sequence, or other set, or in an appropriate organizational structure (e.g., files, directories, with appropriate file links, etc.) required to make a submission; store input documents and/or metadata and/or submission documents and/or other forms of submission data, e.g., in a repository; and transmit electronic submissions to an electronic submission destination. Submission preparation information 204 enables submission kernel 202 to appropriately process a particular document 200, for example by telling the submission kernel 202 what type of submission the document 200 relates to, where to find a data required to be inserted into a particular submission document or field, what format is required for the submission, how to assemble the table of contents, etc. Submission preparation information 204 enables submission kernel 202 to be used for electronic submissions in general where the tailoring for a given set of submission requirements can be captured using submission preparation information 204. This can enable combining the electronic submission preparation process with other systems such as content management systems, work flow systems, versioning systems, archiving or retention systems, or any other appropriate systems. For example, submission preparation information 204 may be used to cause a web services or other request to be generated, possibly using a data extracted from the document 200, and the result returned used to assemble the electronic submission. Or, receipt of document 200 may trigger a business process, e.g., for approval of included content, with the outcome of the business process (e.g., content after review, editing, and/or approval) included in the electronic submission. Submission kernel 202 creates derived document 208 which is stored in file system, data base, and/or repository 206. Document 200 is also stored in file system, data base, and/or repository 206. In some embodiments, document 200 and/or associated metadata is shared by multiple submissions and can be referred to in the file system, database, and/or repository 206. In some embodiments, a work flow system prepares document 200 for approval prior its inclusion into a submission. Once the approval is completed, the work flow system submits document 200, in its approved form, to submission kernel 202.

Figure 3:
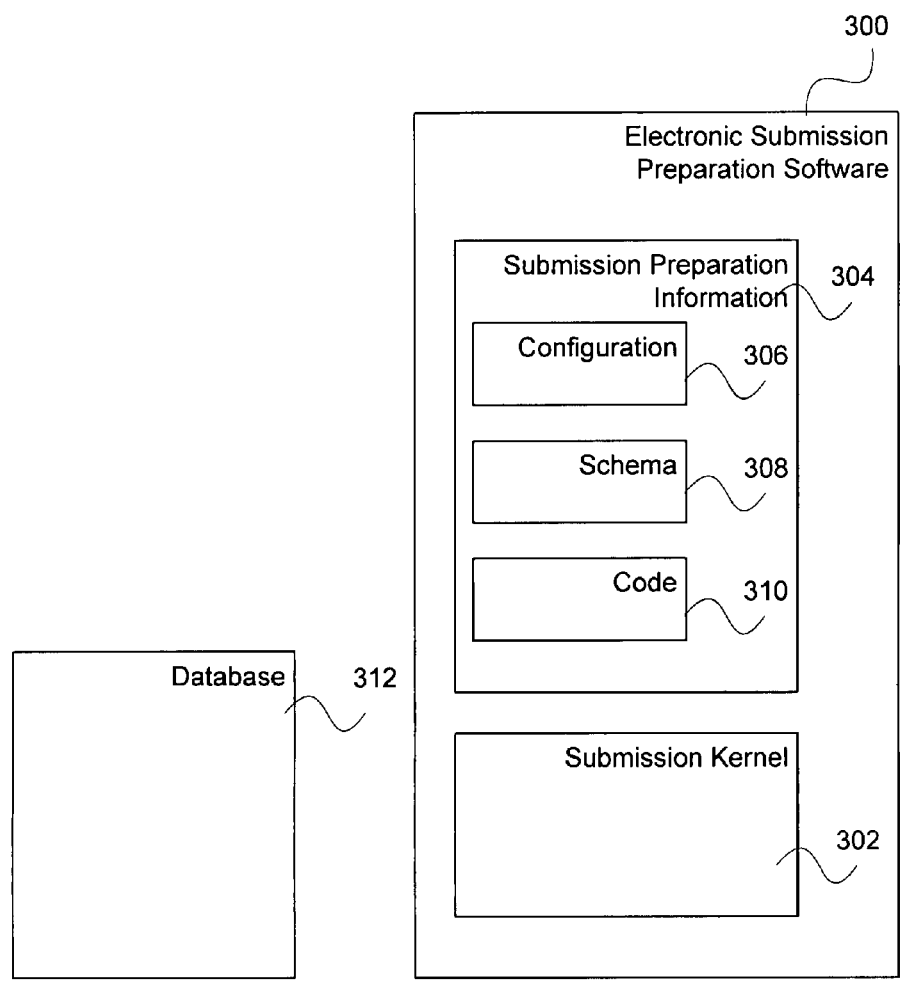
FIG. 3 is a block diagram illustrating an embodiment of software for electronic submission preparation.

FIG. 3 is a block diagram illustrating an embodiment of software for electronic submission preparation. In the example shown, electronic submission preparation software includes submission kernel 302 and submission preparation information 304. Submission preparation information 304 is used by submission kernel 302 to appropriately process a submitted document. Based on information in a submitted document and/or metadata information associated with the submitted document, submission kernel 302 identifies the appropriate submission preparation information 304 portions for processing the submitted document. Submission preparation information 304 includes configuration 306, schema 308, and code 310. Configuration 306 comprises information enabling a mapping of data in document and/or associated metadata to appropriate submission documents. In some embodiments, submission documents are derived based on document data and/or associated metadata. In some embodiments, a user is prompted for or informed of additional information required to complete a given submission document. Code 310 is code invoked by submission kernel 302 when processing submitted document. Schema 308 is a schema associated with the electronic submission.

As an example, a new drug application is submitted to the food and drug administration (FDA) using Electronic Common Technical Document (eCTD). eCTD allows for the electronic submission of the Common Technical Document (CTD) from an applicant to a regulator such as the FDA. The eCTD Specification is based on XML technology. The specification for the XML structure is the document type definition (DTD). For a new drug application, schema 308 comprises the eCTD DTD.

Database 312 is used for storing of a submitted document (s) and derived document(s) which are being prepared for electronic submission. In some embodiments, metadata information is stored associated with submitted document(s) and/or derived document(s).

Figure 4:
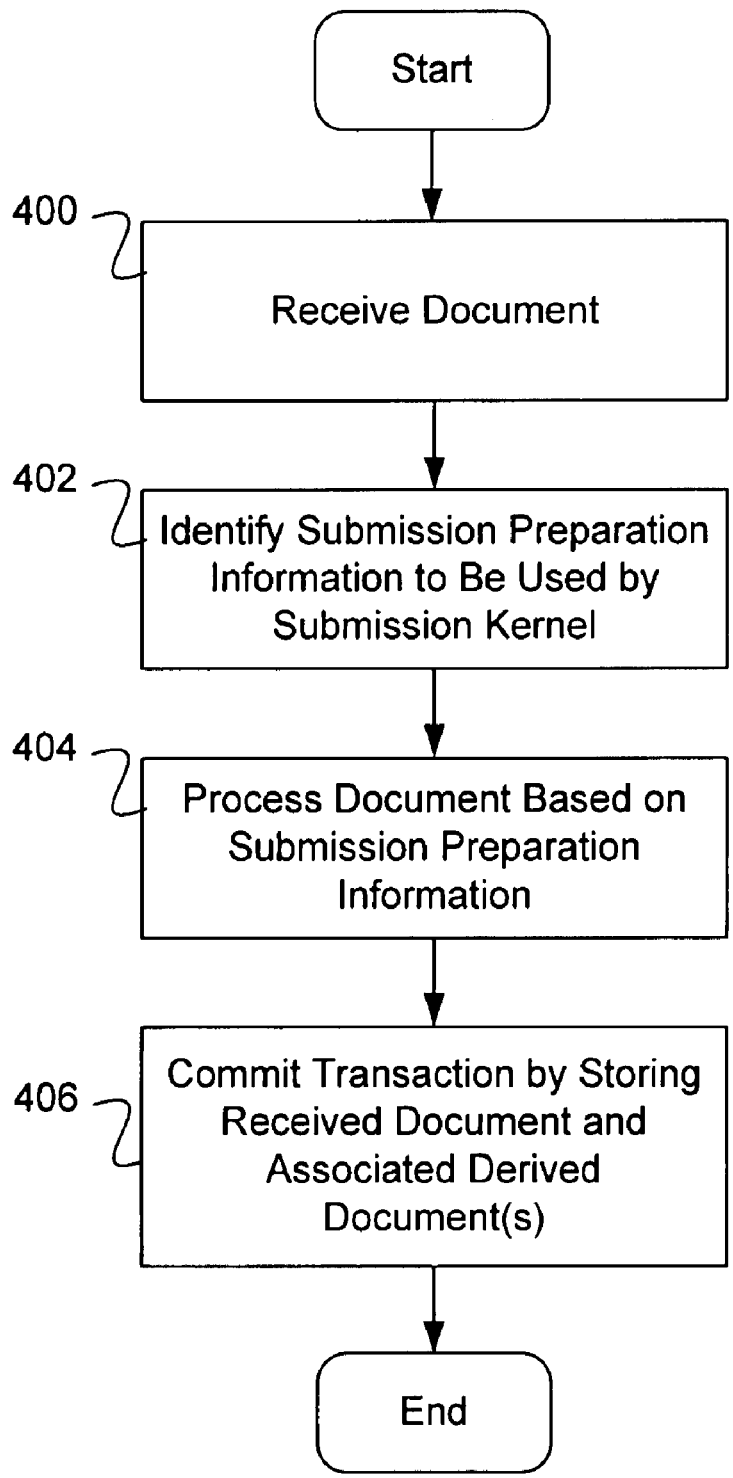
FIG. 4 is a flow diagram illustrating an embodiment of a process for electronic submission preparation.

FIG. 4 is a flow diagram illustrating an embodiment of a process for electronic submission preparation. In the example shown, in 400 a document is received. In some embodiments, metadata associated with the document is also received. In some embodiments, a plurality of documents is received. In various embodiments, one or more documents is/are received by referring to an already stored document, a document in a folder, a folder of documents, or any other appropriate document using a list, a link, a graphical user interface or any other appropriate manner of indicating of one or more documents. In 402, submission preparation information is identified to be used by submission kernel. In 404, the document is processed based on submission preparation information. In various embodiments, submission preparation information comprises schema information, configuration information, and code, or any other appropriate submission preparation information. In some embodiments, processing uses condition-action statements. In 406, an associated transaction is committed, e.g., by storing one or more of the received document, associated metadata, and associated derived document(s). In some embodiments, the received document and/or associated metadata information is/are already stored, so a reference or link is/are stored instead of storing the document or metadata again.

Figure 5:
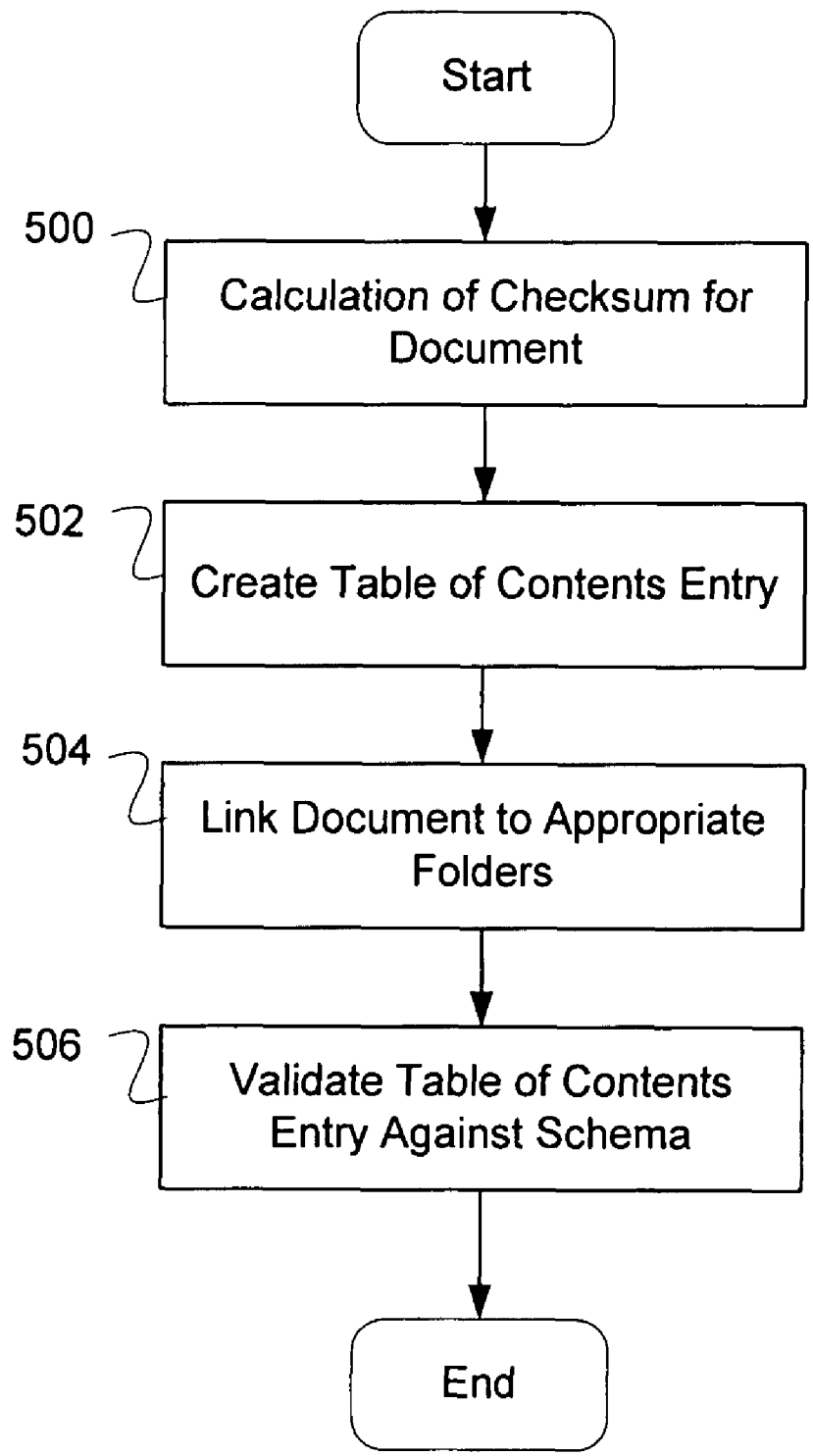
FIG. 5 is a flow diagram illustrating an embodiment of a process for processing a document for electronic submission preparation.

FIG. 5 is a flow diagram illustrating an embodiment of a process for processing a document for electronic submission preparation. In some embodiments, the process of FIG. 5 is used to implement 404 of FIG. 4. In the example shown, in 500 a checksum for document is calculated. In some embodiments, validation against a specification (e.g., eCTD specification) is performed and the checksum is calculated. In 502, a table of contents entry is created. In some embodiments, a new drug application comprises on the order of 200,000 documents. The building of a table of contents automatically based on a document that is part of the submission that is compatible with the eCTD requirements can substantially improve productivity and the accuracy of the submitted documents. In 504, document is linked to the appropriate folders. In 506, the table of contents entry is validated against schema.

In some embodiments, processing the submitted file(s) for electronic submission preparation includes one or more of the following: hypertext link validation in files (e.g., portable document format files), job scheduling for electronic submission (e.g., once the submission is prepared a job can be scheduled to transmit the table of contents and associated documents to a regulator such as the FDA nightly until submission is successfully transmitted), interfacing publishing software (e.g., external paper publishing software), interfacing to external device (e.g., to transfer submission to a compact disc or other appropriate storage medium or device), validating the submitted file(s) against extensible markup language (XML) schemas, validating external location of a web resource in submission files (e.g., a href attribute specified in the XML files), removing empty sections in the table of contents before publishing or transmitting the submission, or any other appropriate processing.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for preparing an electronic submission, comprising:
    receiving a document;
    identifying, based at least in part on information from the document, a submission preparation information to be used by a submission kernel to process, wherein the submission kernel is configured to be general to one or more types of processing of the document, wherein the submission preparation information is separate from the document and includes a set of instructions to be used to process any particular document and wherein identifying the submission preparation information includes identifying one or more portions of the set of instructions appropriate to be used to process the document; and
    processing the document based at least in part on a type of processing as indicated by the identified one or more portions of the set of instructions included in the submission preparation information to produce one or more derived document outputs.

2. A method as in claim 1, wherein receiving the document comprises receiving a reference to a document.

3. A method as in claim 1, further comprising receiving metadata associated with the received document.

4. A method as in claim 1, wherein the submission preparation information includes a configuration.

5. A method as in claim 1, wherein the submission preparation information includes a schema.

6. A method as in claim 1, wherein the submission preparation information includes a code.

7. A method as in claim 1, wherein the one or more derived document outputs includes a table of contents.

8. A method as in claim 7, wherein the table of contents is expressed in XML.

9. A method as in claim 1, wherein processing the document includes validation of a table of contents against a schema.

10. A method as in claim 1, wherein processing the document includes calculating a checksum.

11. A method as in claim 1, wherein processing the document includes linking the document to a folder.

12. A method as in claim 1, wherein processing the document includes validating hypertext links.

13. A method as in claim 1, wherein processing the document includes scheduling electronic submission.

14. A method as in claim 1, wherein processing the document includes interfacing to publishing software.

15. A method as in claim 1, wherein processing the document includes interfacing to an external device.

16. A method as in claim 1, wherein processing the document includes validating the document against XML schemas.

17. A method as in claim 1, wherein processing the document includes removing empty table of content sections.

18. A method as in claim 1, wherein processing the document includes validating external location of web resources specified in submission files.

19. A method as in claim 1, further comprising storing the document.

20. A method as in claim 1, further comprising storing metadata associated with the document.

21. A method as in claim 1, further comprising storing the one or more derived document outputs.

22. A computer program product for preparing an electronic submission, the computer program product being embodied in a computer readable medium and comprising computer instructions for:
    receiving a document;
    identifying, based at least in part on information from the document, a submission preparation information to be used by a submission kernel to process, wherein the submission kernel is configured to be general to one or more types of processing of the document, wherein the submission preparation information is separate from the document and includes a set of instructions to be used to process any particular document and wherein identifying the submission preparation information includes identifying one or more portions of the set of instructions appropriate to be used to process the document; and
    processing the document based at least in part on a type of processing as indicated by the identified one or more portions of the set of instructions included in the submission preparation information to produce one or more derived document outputs.

23. A system for preparing an electronic submission, comprising:
    a processor; and
    a memory coupled with the processor, wherein the memory is configured to provide the processor with instructions which when executed cause the processor to:
    receive a document;
    identify, based at least in part on information from the document, a submission preparation information to be used by a submission kernel to process, wherein the submission kernel is configured to be general to one or more types of processing of the document, wherein the submission preparation information is separate from the document and includes a set of instructions to be used to process any particular document and wherein identifying the submission preparation information includes identifying one or more portions of the set of instructions appropriate to be used to process the document; and
    process the document based at least in part on a type of processing as indicated by the identified one or more portions of the set of instructions included in the submission preparation information to produce one or more derived document outputs.

* * * * *